United States Patent

Anderson et al.

[15] 3,697,831

[45] Oct. 10, 1972

[54] SERIES ELECTRICAL, PARALLEL THERMAL GUNN DEVICES

[72] Inventors: Wallace E. Anderson, Beltsville; Albert D. Krall, Rockville; Albert M. Syeles, Silver Spring, all of Md.

[73] Assignee: The United States of America as represented by the Secretary of the Navy

[22] Filed: Dec. 28, 1970

[21] Appl. No.: 101,566

[52] U.S. Cl.........317/235 R, 317/234 Y, 331/107 G

[51] Int. Cl...............................................H01l 5/02

[58] Field of Search...................317/234; 331/107 G

[56] References Cited

UNITED STATES PATENTS

| | | | |
|---|---|---|---|
| 3,479,611 | 11/1969 | Sandbank et al. | 331/52 |
| 3,274,457 | 9/1966 | Wislocky | 317/234 |

*Primary Examiner*—John W. Huckert
*Assistant Examiner*—E. Wojciechowicz
*Attorney*—R. S. Sciascia, J. A. Cooke, R. J. Erickson and B. A. Cooper

[57] ABSTRACT

A plurality of Gunn devices are electrically connected in series and thermally connected in parallel and include a layer of active semiconductive material, a first plurality of electrical contacts disposed along one side of the active semiconductive material and a second plurality of electrical contacts disposed along another side of the active semiconductive material. The electrical contacts disposed along one side of the semiconductive layer overlap corresponding electrical contacts disposed along the other side of the active semiconductive layer to form a plurality of Gunn devices in the active semiconductive layer defined by the overlapping areas of the electrical contacts. In one embodiment of the invention, the electrical contacts on one side of the semiconductive layer alternate with the electrical contacts on the other side of the semiconductive layer such that the end portions of the respective contacts disposed along opposite sides of the semiconductive material overlap. In an alternate embodiment of the invention, the electrical contacts disposed along one side of semiconductive layer are connected by microstrip transmission lines located on heat sink such that the plurality of Gunn devices are locked in phase.

8 Claims, 5 Drawing Figures

Wallace E. Anderson
Albert D. Krall
Albert M. Syeles
INVENTORS
Barry A. Cooper
AGENT
BY J. A. Cooke
ATTORNEY

SERIES ELECTRICAL, PARALLEL THERMAL GUNN DEVICES

BACKGROUND OF THE INVENTION

This invention relates generally to Gunn devices and, more particularly, to Gunn devices electrically connected in series and thermally connected in parallel.

Gunn devices per se, such as Gunn oscillators or the like, are well known in the art and have been disclosed, for example, in U.S. Pat. No. 3,365,583 issued to J. B. Gunn for "Electric Field-Responsive Solid State Devices." Often it is desirable to connect a plurality of Gunn devices electrically in series. One heretofore employed method for connecting a plurality of Gunn devices electrically in series stacks the individual Gunn devices one atop each other. This method is somewhat unsatisfactory in that the Gunn devices are also thermally connected in series such that the heat generated in an individual device must pass through the other devices located adjacent thereto before reaching a heat sink, or the like, in which case the dissipation of heat may damage the devices. Furthermore, it is difficult to fabricate the individual devices one atop each other since each individual Gunn device is small in size and the stacking one atop each other becomes difficult as the number of Gunn devices increase.

SUMMARY OF THE INVENTION

Accordingly, one object of the present invention is to provide Gunn devices, or the like, electrically connected in series and thermally connected in parallel.

Another object of the instant invention is to provide a plurality of Gunn devices having ease of fabrication.

A further object of this invention is to provide a plurality of Gunn devices which operate satisfactorily when connected in series.

Briefly, these and other objects of the present invention are attained by providing a plurality of Gunn devices fabricated along a single layer of active semiconductor material. Corresponding ohmic contacts located on each side of the semiconductive layer overlap to define a plurality of Gunn devices which are electrically connected in series and thermally connected in parallel. If desired, the Gunn devices may be fabricated such that the plurality of devices operate in phase.

BRIEF DESCRIPTION OF THE DRAWINGS

A more complete understanding of the invention and many of the attendant advantages thereof will be readily appreciated as the same becomes better understood by reference to the following detailed description when considered in connection with the accompanying drawings wherein.

DESCRIPTION OF THE PREFERRED EMBODIMENTS

Figure 1:
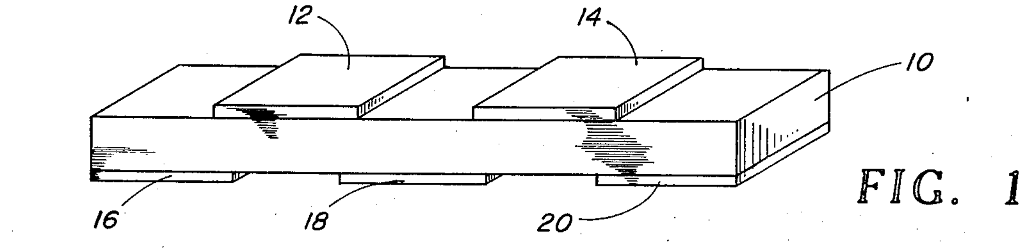
FIG. 1 is a schematic perspective view of the series electrical, parallel thermal Gunn devices according to the present invention.

Referring now to the drawings wherein like reference numerals designate corresponding parts throughout the several views and, more particularly, to FIG. 1 thereof, the series electrical, parallel thermal Gunn devices according to the present invention are shown as fabricated from a single layer of active semiconductive material 10 such as, for example, GaAs or the like. A first plurality of ohmic contacts such as, for example, ohmic contacts 12 and 14 are disposed along one side of the semiconductive material and overlap a second plurality of ohmic contacts such as, for example, ohmic contacts 16, 18, and 20 disposed along the opposite side of the active semiconductive layer.

Figure 2:
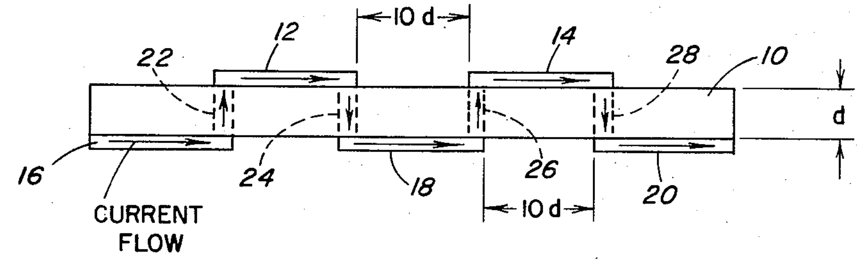
FIG. 2 is a schematic elevation view of the Gunn devices of FIG. 1.

As more apparent in FIG. 2, the ohmic contacts disposed on one side of the active semiconductive layer 10 alternate with the ohmic contacts disposed along the other side of the semiconductive layer and partially overlap the corresponding ohmic contacts disposed along the other side to define a plurality of Gunn devices which are electrically connected in series and thermally connected in parallel. More particularly, ohmic contact 12 overlaps ohmic contacts 16 and 18 to form, respectively, Gunn devices 22 and 24 within the active layer defined by the overlapping areas of ohmic contacts 12 and 16 and ohmic contacts 12 and 18, respectively, as shown in dashed line. Similarly, ohmic contact 14, disposed atop the semiconductive layer, overlaps ohmic contacts 18 and 20, disposed on the opposite side of the semiconductive layer, to form Gunn devices 26 and 28, respectively, defined by the overlapping areas of the ohmic contacts. It is readily apparent, that additional overlapping ohmic contacts disposed along opposite sides of the active semiconductive layer may be included to form additional Gunn devices if so desired.

As shown in FIG. 2, the current flow through the Gunn devices when an appropriate d.c. source (not shown) is connected between ohmic contacts 16 and 20. As indicated therein, a current path may be traced through ohmic contact 16, upwardly through Gunn device 22, through ohmic contact 12, and downwardly through Gunn device 24. The current path continues through ohmic contact 18, upwardly through Gunn device 26, through ohmic contact 14, and downwardly through Gunn device 28 to ohmic contact 20. It is readily apparent, therefore, that the current flow through Gunn devices 22, 24, 26, and 28 is electrically in series while, as hereinafter more fully explained, allowing dissipation of heat as if the Gunn devices were thermally connected in parallel. It is to be noted, for proper operation of the Gunn devices in series, that is, for current to flow through the aforedescribed path, rather than flowing directly from ohmic contact 16 to ohmic contact 18 via the active semiconductive layer, the distance between adjacent ohmic contacts disposed along either side of the semiconductive material should be greater than the thickness of the semiconductive layer. By way of example, it has been found that satisfactory results may be obtained if the distance between adjacent ohmic contacts, such as between contacts 12 and 14 or the distance between contacts 18 and 20, is approximately ten times greater than the thickness of semiconductive layer 10.

Figure 3:
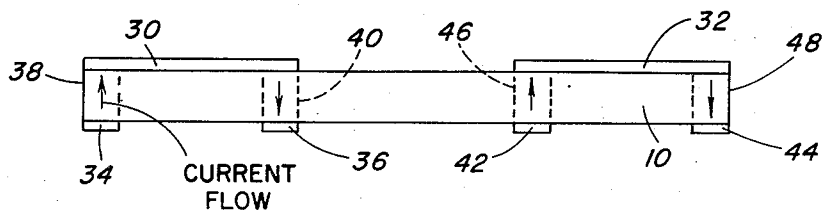
FIG. 3 is a schematic elevation view of an alternative embodiment of the present invention.

FIG. 3 shows an alternative embodiment of the invention wherein ohmic contacts 30 and 32 are disposed and contiguous with one surface of active semiconductive layer 10. As indicated therein, ohmic contact 30, disposed along one side of the active layer, overlaps ohmic contacts 34 and 36, disposed and contiguous with the opposite side of semiconductive layer 10, to define within active semiconductive layer Gunn devices 38 and 40, respectively. Similarly, ohmic contact 32 overlaps ohmic contacts 42 and 44 to form Gunn devices 46 and 48 within the semiconductive layer. As will be hereinafter more fully explained, Gunn devices 38, 40, 46 and 48 are connected electrically in series and thermally in parallel such that, for example, substantially the same current flows upwardly in Gunn devices 38 and 46 and downwardly in Gunn devices 40 and 48. Furthermore, as will be more apparent hereinafter, the current path from ohmic contact 36 to ohmic contact 42 is completed via a microstrip transmission line or the like which, when chosen of appropriate length, insures that the phases of the individual Gunn devices are kept in unison.

Figure 4:
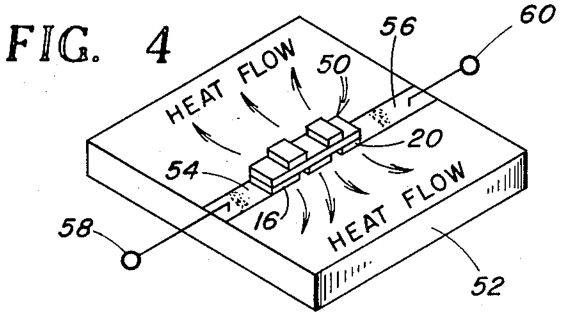
FIG. 4 is a schematic perspective view incorporating the plural Gunn devices of FIG. 1.

Reference to FIG. 4, illustrates a plurality of series electrical, parallel thermal Gunn devices 50, similar to those embodied in FIG. 1, disposed atop an appropriate heat sink 52, which may be a dielectric material, such as, for example, a ceramic material or the like. A microstrip transmission line 54 and a microstrip transmission line 56 are connected, respectively, to ohmic contacts 16 and 20 for providing power to Gunn devices, the power being provided from a power source (not shown) connectable to terminals 58 and 60, the later coupled to the microstrip transmission lines.

In operation, with appropriate power applied between terminals 58 and 60, the individual Gunn devices defined by the overlapping ohmic contacts disposed along opposite sides of the active semiconductive layer, operate electrically in series. More particularly, the plurality of Gunn devices exhibit characteristics of series operation, that is, the currents flowing through each individual Gunn device are substantially equal. Furthermore, the total power output and the total impedance are the sums, respectively, of the individual powers and the individual impedances of the individual Gunn devices while the voltage threshold for the series of devices is the sum of the individual threshold voltages of each individual device.

It is to be noted, however, that while the plurality of Gunn devices operate electrically in series, the heat generated in each device is dissipated as if the devices were connected thermally in parallel. That is, the heat generated in each device travels to heat sink 52 without passing through any other individual device. It is readily apparent, therefore, that the Gunn devices according to the present invention provide series electrical operation without the disadvantages of stacking, or the like, and, therefore, provide heat dissipation thermally in parallel. Furthermore, no individual device has been observed to operate by itself when connected in series and all devices appear to operate in unison even though individual differences may appear when each individual device is operated singly. Furthermore, the microwave output signal from the plurality of Gunn devices exhibits a distinctly defined frequency value despite the fact that different frequency outputs may appear when their devices are tested individually.

Figure 5:
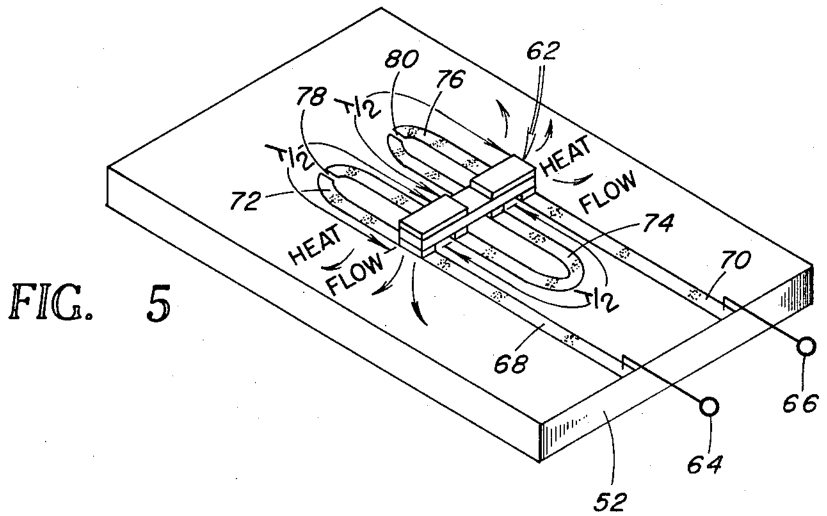
FIG. 5 is a schematic perspective view of an alternative embodiment of the present invention incorporating the plural Gunn devices of FIG. 3.

Reference to FIG. 5 illustrates an alternative embodiment of the present invention wherein a plurality of Gunn devices 62, similar to those indicated in FIG. 3, are fabricated to operate electrically in series and thermally in parallel whereby the individual Gunn devices operate in phase. The Gunn devices are mounted on an appropriate heat sink 52, such as, for example, a ceramic dielectric or the like. Terminals 64 and 66, connected to microstrip transmission lines 68 and 70, respectively, are connectable to an appropriate power source (not shown) for supplying power to the Gunn devices. Microstrip transmission lines 72, 74, and 76, each of a length approximately one half-wavelength, are connected, respectively, to adjacent ohmic contacts disposed between the active semiconductive layer and the dielectric heat sink. More particularly, referring to both FIG. 3 and FIG. 5, half-wavelength microstrip transmission line 72 is connected between ohmic contact 34 and ohmic contact 36, half-length microstrip transmission line 74 is connected between ohmic contact 36 and ohmic contact 42, and half-wavelength microstrip transmission line 76 is connected between ohmic contact 42 and ohmic contact 44.

In operation, a d.c. current path may be traced from terminals 64, microstrip transmission line 68, ohmic contact 34, Gunn device 38, ohmic contact 30, Gunn device 40, to ohmic contact 36. The d.c. current path continues from ohmic contact 36 to ohmic contact 42, via microstrip transmission line 74, and through Gunn device 46, ohmic contact 32, Gunn device 48, ohmic contact 44, microstrip transmission line 70, to terminal 66. It is readily apparent, therefore, that current flows electrically in series through Gunn devices 38, 40, 46, and 48. It is to be noted, however, that the d.c. current does not flow through microstrip transmission lines 72 and 76 which include, respectively, a gap 78 and a gap 80 which act as capacitors to block the d.c. current flow. However, RF energy flows through the microstrip transmission lines 72, 74, and 76, half-wavelength in length, respectively, to insure that the propagating RF field is kept in phase with each Gunn device to provide optimum coupling of power. More particularly, microstrip transmission lines 72, 74, and 76 physically separate Gunn devices 38, 40, 46 and 48 by half wavelengths to insure that the phases of these Gunn devices are kept identical. It is readily apparent, therefore, that series electrical operation of the plurality of Gunn devices is obtained while keeping the phase of each individual Gunn device equal to the phase of the other Gunn devices. Furthermore, the heat is dissipated from the Gunn devices to the heat sink 52 as if the Gunn devices were connected thermally in parallel.

The fabrication of the series electrical, parallel thermal Gunn devices according to the present invention, may be readily achieved by utilizing slices of bulk grown semiconductive material wherein the ohmic contacts, which may be, for example, germanium or the like, are formed by known etching or masking techniques. It is understood, of course, that the Gunn devices according to the present invention may be fabricated by utilizing epitaxial material if so desired.

It is readily apparent, therefore, that the Gunn devices according to the present invention provide series electrical operation while providing parallel thermal operation and may further provide in-phase operation if so desired. Obviously, numerous modifications and variations of the present invention are possible in light of the above teachings. More particularly, it is readily apparent that the invention is not limited to the number of Gunn devices shown but may be applicable to any plurality of Gunn devices fabricated by overlapping ohmic contacts. It is therefore to be understood that within the scope of the appended claims the invention may be practiced otherwise than as specifically described.

What is new and desired to be claimed by Letters Patent of the United States is:

1. A Gunn device assembly comprising a layer of active semiconductive material, a first set of electrical contacts including a plurality of electrical contacts contiguous with one side of said active semiconductive layer, and a second set of electrical contacts including a plurality of electrical contacts parallel to said first set of contacts and contiguous with another side of said active semiconductive layer, said second set of electrical contacts overlapping said first set of electrical contacts to form a plurality of Gunn devices in said active semiconductive layer defined by the overlapping areas of said first and said second sets of electrical contacts. "wherein the lateral distance between adjacent electrical contacts is greater than the thickness of said active semiconductive layer wherein said plurality of Gunn devices are electrically in series and thermally in parallel."

2. A Gunn device assembly according to claim 1 wherein said Gunn device assembly is mounted on a heat sink.

3. A Gunn device assembly according to claim 1 wherein each electrical contact of said first set of electrical contacts overlaps adjacent electrical contacts of second set of electrical contacts and each electrical contact of said second set of electrical contacts overlaps adjacent electrical contacts of said first set of electrical contacts.

4. A Gunn device assembly according to claim 1 wherein each electrical contact of said first set of electrical contacts overlaps two adjacent electrical contacts of said second set of electrical contacts to form a single pair of Gunn devices in the portions of said active semiconductive layer defined by extending between the overlapping areas of said electrical contacts, and means for providing a current path between adjacent pairs of said Gunn devices.

5. A Gunn device assembly according to claim 4 further comprising means for providing an ac current path between individual Gunn devices forming a single pair of Gunn devices and for maintaining the phase of said individual Gunn devices substantially identical.

6. A Gunn device assembly according to claim 5 wherein said ac current path means maintains the phase of said plurality of Gunn devices substantially identical.

7. A Gunn device assembly according to claim 6 wherein said means for providing a current path between adjacent pairs of said Gunn devices and said means for providing an ac current path are of lengths substantially equal to $\lambda/2$ wherein $\lambda$ is the wavelength of said plurality of Gunn devices.

8. A Gunn device assembly according to claim 7 wherein said a.c. path comprises a microstrip transmission line, said line having gaps to block d.c. current flow.

* * * * *